March 11, 1930.  H. R. MOYER  1,750,278
COMPOSITE GEAR
Filed March 13, 1924
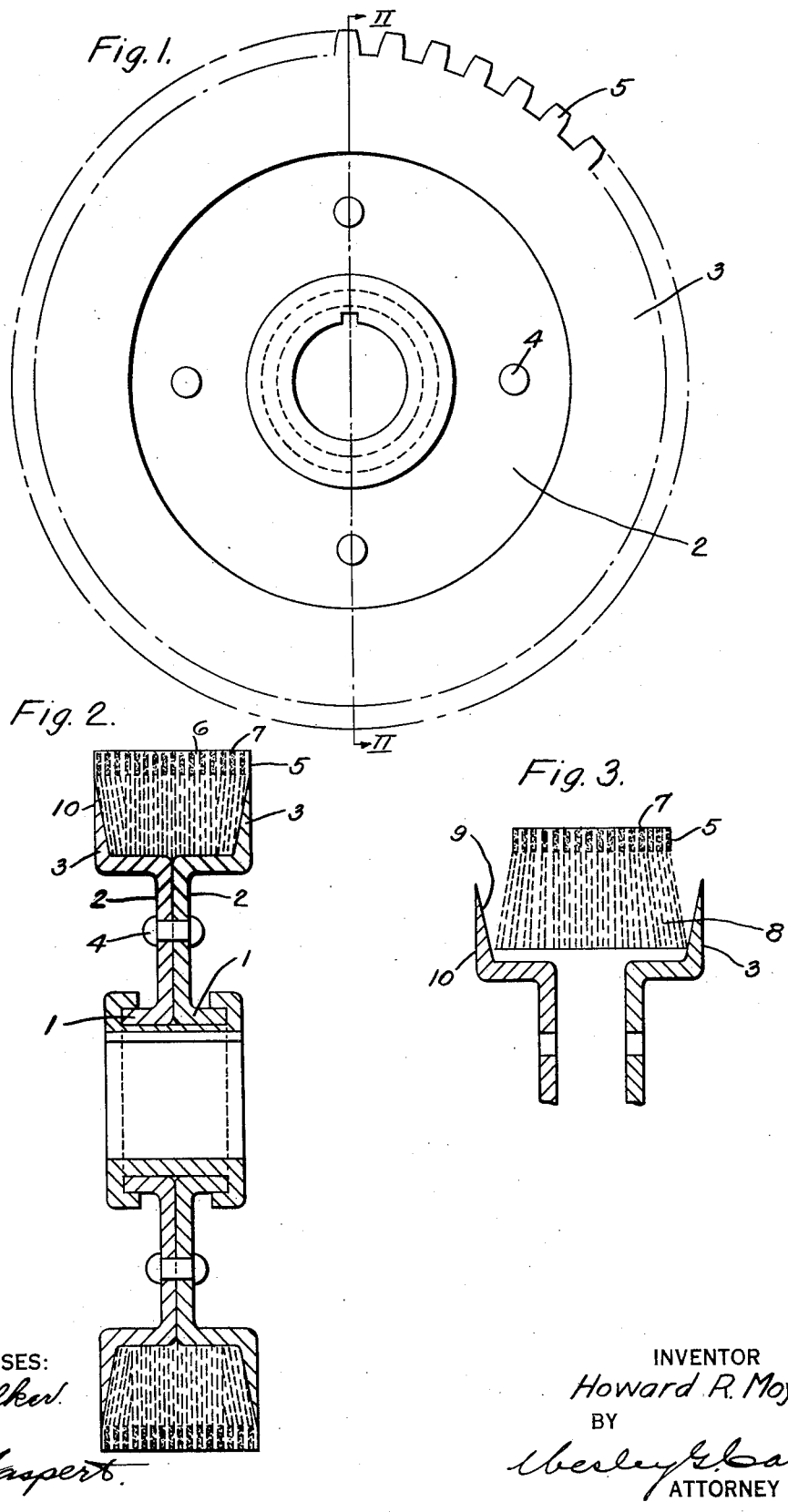
WITNESSES:
INVENTOR
Howard R. Moyer.
BY
ATTORNEY Patented Mar. 11, 1930

1,750,278

UNITED STATES PATENT OFFICE

HOWARD R. MOYER, OF WILKINSBURG, PENNSYLVANIA, ASSIGNOR TO WESTINGHOUSE ELECTRIC & MANUFACTURING COMPANY, A CORPORATION OF PENNSYLVANIA

COMPOSITE GEAR

Application filed March 13, 1924. Serial No. 698,883.

My invention relates to composite gear wheel structures, more particularly to gear wheels embodying metallic hub constructions and non-metallic rim portions which are molded or otherwise secured to the hub member.

It is among the objects of my invention to provide a composite gear wheel structure in which the rim portion is secured between a pair of extending flanges of the hub member which shall be of simple, durable and inexpensive construction.

It is a further object of my invention to provide a composite gear wheel structure which shall have a relatively durable working body portion in which the gear teeth are formed and a substantial web and hub portion with an intermediate resilient portion that is capable of absorbing sudden shock or impact to which the gear teeth may be subjected.

There has been proposed a composite gear wheel structure comprising a non-metallic rim portion which is partially secured between the flanges of a supporting hub member and in which the outer edge of the rim portion is consolidated with a hardened binder.

My present invention is directed to a structure similar in its final construction but which involves a different means for making the non-metallic portion so as to more uniformly control the treating of the fibrous material and the subsequent consolidation thereof and to confine the treating to the body portion in which the characteristics of such a consolidated mass are desirable.

Instead of treating the portion of the rim which projects beyond the flanged hub members, I utilize a plurality of untreated layers of fibrous sheet material and insert between alternate layers, strips of treated material which are of lesser width so that the non-treated portion may be clamped between the flanges, and the projecting portion may be consolidated by the application of heat and pressure to constitute the working body portion of a gear wheel.

In the accompanying drawing constituting a part hereof and in which like reference characters designate like parts:

Fig. 1 is a side elevational view of a gear wheel embodying the principles of my invention, Fig. 2 is a cross-sectional view thereof taken along the line II—II of Fig. 1, and Fig. 3 is an exploded, fragmentary view thereof illustrating the construction of the rim member before assembling the same between the flanges of the hub.

Referring to Figs. 1 and 2, the gear wheel comprises a pair of hub portions 1 formed integral with webs 2 and terminating in extended flanged portions 3, the hub portions being joined together by rivets 4, or in any other suitable manner. A non-metallic rim portion 5 comprises a plurality of layers of fibrous sheet material 6 which are disposed in superposed relation and have inserted at the outer periphery thereof strips 7 of smaller face width which are impregnated or otherwise treated with a suitable binding agent, such as a phenolic condensation product.

The exposed rim portion 5 is consolidated by subjecting the same to heat and pressure to provide a working surface and a spread or mushroomed inner portion 8, Fig. 3. The rim is assembled between the flanges 3 which have tapered inner faces 9. The difference in the density of the treated and molded portion 5 of the rim and the spread untreated portion 8 permits of compacting the untreated portion between the flanges 3 to such a degree as will bring the faces 10 of the flanges 3 in alinement with the consolidated portion 5 of the rim.

The purpose of the treated strips 7 is to facilitate the treatment of the molded portion of the gear wheel which is otherwise difficult to control because of the tendency of the treating liquid or binder to spread throughout the fibrous material by capillary action in an uncontrollable manner depending upon the viscosity of the liquid.

By utilizing treated strips a uniform treatment is obtained which confines the binding material to a specific portion of the rim member. Besides the control of the treatment which such inserted strips afford, the use of the strips also facilitates the manufacture of the gear wheels which would otherwise involve the tedious and costly process of partially treating the strips.

It is evident from the foregoing description of my invention that gear wheels made in accordance therewith provide a simple and efficient structure that is applicable to drive mechanisms in which it is desirable to eliminate vibration and excessive noise. The non-treated portion of the rim members function to entirely absorb the vibration thereby eliminating resonance which produces the noises in running gear trains.

Although I have described a specific embodiment of my invention, it will be obvious to those skilled in the art that various modifications may be made in the details of construction and the design of the supporting element wthout departing from the principles herein set forth.

I claim as my invention:—

1. A composite article comprising a flanged hub portion and a non-metallic untreated rim portion, the latter being partially clamped between the flanges of said hub, the exposed portion having inserts of fibrous sheet material treated with a hardened binder.

2. A composite article comprising a flanged hub and a rim partially clamped between the flanges of said hub, said rim comprising layers of untreated fibrous sheet material having inserts of treated material disposed between alternate layers of the exposed portion thereof.

3. A composite article comprising a metallic hub, a non-metallic rim mounted thereon and secured thereto by parallel flanges of said hub engaging a portion thereof, said rim consisting of relatively wide layers of untreated fibrous sheet material having layers of a lesser width inserted therebetween in the portion of the rim extending beyond the flanges of said hub, said narrow layers being consolidated with a hardened binder.

4. A composite article comprising a metallic hub, a non-metallic rim mounted thereon and secured thereto by parallel flanges of said hub engaging a portion thereof, said rim consisting of relatively wide layers of untreated fibrous sheet material having layers of a lesser width inserted therebetween in the portion of the rim extending beyond the flanges of said hub, said narrow layers being joined to said wide layers by a hardened binder.

5. A composite article comprising a metallic hub, a non-metallic rim mounted thereon and secured thereto by parallel flanges of said hub engaging a portion thereof, said rim consisting of relatively wide layers of untreated fibrous sheet material having layers of a lesser width inserted therebetween in the portion of the rim extending beyond the flanges of said hub, said narrow layers being treated with a binder and consolidated with said wide layers.

6. A composite article comprising a hub portion and a non-metallic rim composed of an inner portion and an outer consolidated portion, said inner portion consisting of layers of untreated fibrous sheet material and said outer portion consisting of alternate layers of treated and untreated fibrous sheet material, the untreated layers of said outer portion being integral with the untreated layers of said inner portion.

7. A composite article comprising a flanged hub portion and a rim partially clamped between the flanges of said hub, forming an inner clamped portion and an outer exposed portion, said inner clamped portion being composed of layers of an untreated fibrous sheet material and said outer portion being composed of alternate layers of treated fibrous sheet material and untreated fibrous sheet material, the untreated layers of said outer portion being integral with the untreated layers of said inner portion.

8. A composite article comprising a hub having a pair of outwardly extending flanges with parallel outer surfaces and outwardly beveled inner surfaces and a non-metallic rim composed of an inner portion and an outer portion of varying density, the inner portion of said rim being compressed between the flanges so that the upper and lower surface of said outer portion will be on a radial plane with the outer surfaces of said flanges.

9. A composite article comprising a hub and a non-metallic rim having a partially consolidated portion comprising alternate layers of treated and untreated material, said layers of untreated material being extended inwardly from said consolidated portion and being fastened to said hub.

In testimony whereof, I have hereunto subscribed my name this 27th day of February, 1924.

HOWARD R. MOYER.